9/22/81 OR 4,291,222

United States Patent [19]

Gröttrup

[11] 4,291,222

[45] Sep. 22, 1981

[54] METHOD AND APPARATUS FOR CARD AUTHENTICATION USING DISPLAY OF SYMBOLS FOR IDENTIFICATION OF A PERSONAL CODE WORD

[75] Inventor: Helmut Gröttrup, Munich, Fed. Rep. of Germany

[73] Assignee: GAO Gesellschaft fur Automation und Organisation mbH, Munich, Fed. Rep. of Germany

[21] Appl. No.: 52,033

[22] Filed: Jun. 25, 1979

[30] Foreign Application Priority Data

Dec. 29, 1977 [DE] Fed. Rep. of Germany ....... 2758754

[51] Int. Cl.³ ............................................ G06K 5/00

[52] U.S. Cl. .................................... 235/380; 235/382

[58] Field of Search ............... 235/379, 380, 381, 382; 340/149 A

[56] References Cited

U.S. PATENT DOCUMENTS

| | | | |
|---|---|---|---|
| 3,581,063 | 5/1971 | Levasseur | 235/380 |
| 3,702,392 | 11/1972 | Jean | 235/380 |
| 3,863,052 | 1/1975 | Brugger et al. | 235/380 |
| 3,985,998 | 10/1976 | Crafton | 235/380 |

*Primary Examiner*—Daryl W. Cook

*Attorney, Agent, or Firm*—Neuman, Williams, Anderson & Olson

[57] ABSTRACT

Methods and apparatus are provided through which, after insertion of a card into a card reader, a code word is presented which is made up of a certain number of signs or symbols. The user uses a pushbutton or other control to make selections of signs associated with the code word. If the correct signs are selected, an output is developed for control of an appropriate control function. The signs may be presented serially, in parallel or with a combination of serial and parallel presentations. Various means may be used for presentation of the code word and signs.

21 Claims, 7 Drawing Figures

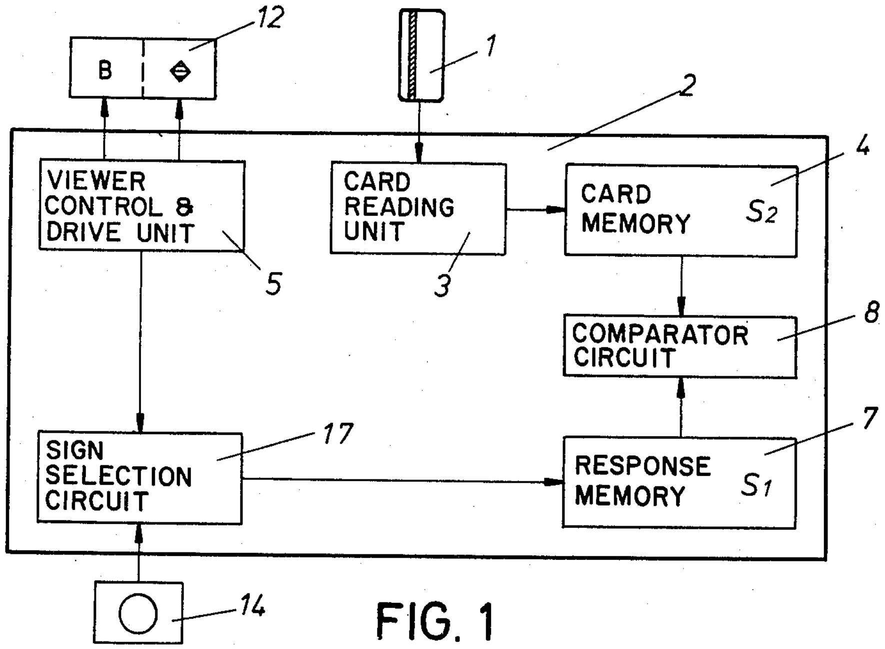
FIG. 1
FIG. 2a
FIG. 2b
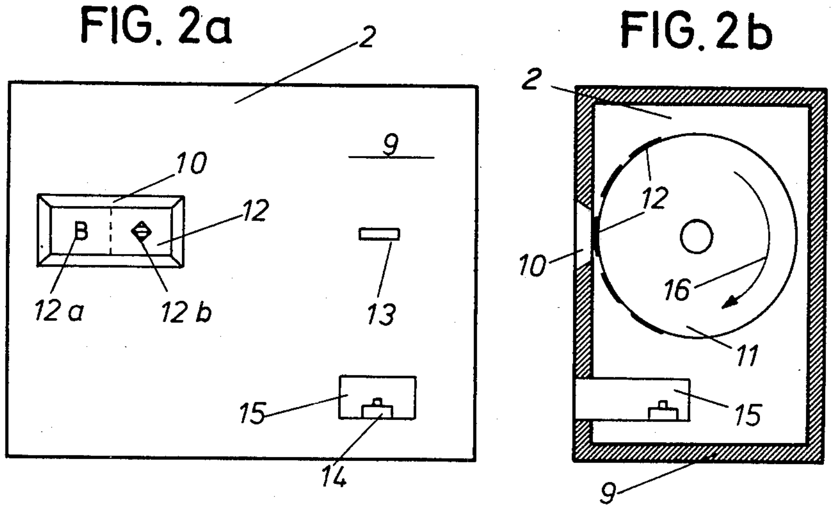

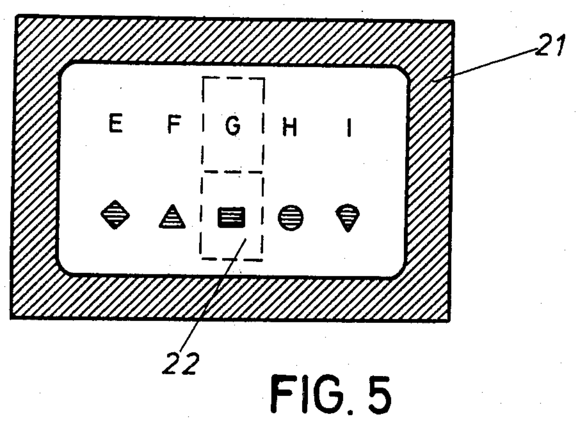
FIG. 5
FIG. 6
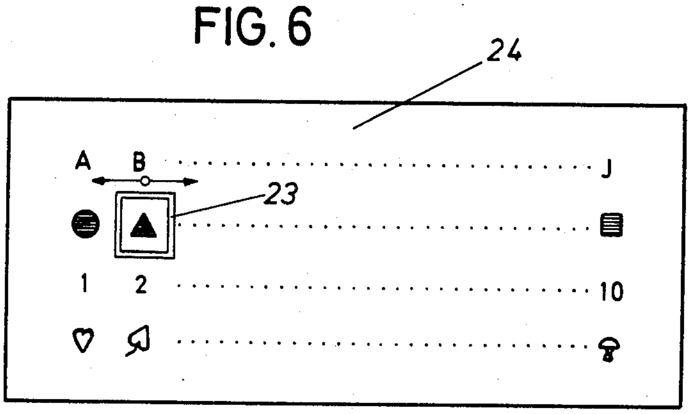

METHOD AND APPARATUS FOR CARD AUTHENTICATION USING DISPLAY OF SYMBOLS FOR IDENTIFICATION OF A PERSONAL CODE WORD

The invention relates to a method for the input of a personal code word in an automatic card reader or the like.

For stopping any unlawful use of credit cards and the like after loss or theft in automatic card readers use is presently made, in nearly all cases, of a personal code word in the form of information stored on the card and designed for machine reading. This code word is used straightway, or after processing with an algorithm, needed for secrecy, or after making a request for information from a central computing unit, for comparison with a code word which is keyed in by the user of the card in the card reader.

This process has two important shortcomings:

1. To keep its price low, a keyboard, necessary for keying the personal code word, normally has the numbers 0 to 9. The input code word is, for this reason, made up of numbers and so hard for the card-user to keep in mind. The use of letters, symbols or other signs, which are more readily kept in mind than numbers, is not possible, because the necessary keyboards are overcomplex and furthermore would not be straightforward enough for most users of the card system.

2. Strangers are able to get knowledge of the code word when input by the user is taking place.

For these reasons, one purpose of the invention is that of producing such a form of the method noted at the start that the code word for input into an automatic card reader is mnemonic in form so it is not possible for others to get knowledge of the code word when input into the card reader is taking place.

For effecting these and other purposes the code word is made up of a certain number of signs or symbols, which together with a number of other signs are presented to the card user at least once, who makes his selection of the number of offered signs one after the other using a control part, the signs of the selection made being in agreement with his code word or parts of it.

The useful effects of the system of the invention are to be seen as being that, on the one hand, a picture-number group or a group made up of pictures and letters is more readily noted by the user as a code word, for example, than a multi-digit number and furthermore the operation of a single electronic or mechanical selection switch or controller at the time the signs are being presented is much harder for some other person to see and make note of than the input of multi-digit number using a keyboard.

The invention may not only be used for automatic card readers, but furthermore for automatic door locks, locks on lockers and the like.

An account will now be given of the invention, whose further developments are claimed in dependent claims, making use of the figures giving details of a card reader.

FIG. 1 is a block diagram for making the general teaching of the method of the invention clear.

FIGS. 2*a* and 2*b* are views from the front and the side of an apparatus for undertaking the process of the invention.

FIG. 5 is a view of part of the stored signs as presented on a viewer.

FIG. 6 is a table of all the stored signs.

Figure 3:
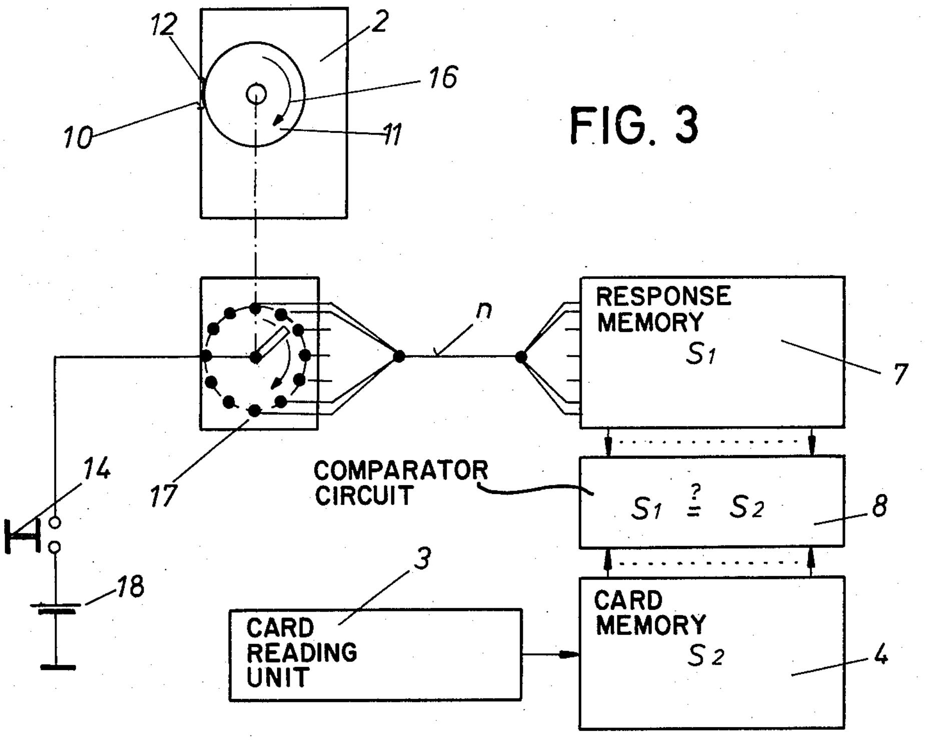
FIG. 3 is a view of an electrical system for undertaking the process of the invention.

Using FIG. 1, firstly a general account will be given of the process of the invention.

Looking at FIG. 1 it will be seen that the card 1, as used normally in such cases, is put into the automatic card reader 2. The personal code word, presented on the card, of the card-user undergoes reading in a reading unit 3 and is sent to a card store or memory ($S_2$) 4 as data.

Unlike presently used methods, by way of a viewer 12 and a controlling unit 5, the card-user is now presented with a number of signs, of which some signs are present in the user code word. In this respect the signs may be letters, numbers or pictures, which are able to be presented in very different ways on viewers (as will be made clear in more detail below) and which may be grouped together in the most different forms as code words.

Every time a sign or sign-group forming part of the code word of the user is presented on the viewer 12 from the overall store of signs, a controller is worked by the user. This controller is joined to a sign selection circuit 17. In this respect, using the selection circuit, which is joined with the viewer driving unit 5, logical information, dependent on the sign in question, is inputted to the memory location representative of the sign, whose selection is made, in a memory ($S_1$) 7 joined with the selection circuit 17.

If necessary, for example dependent on the number of single signs, in the code word the selection is undertaken the necessary number of times, that is to say once for each sign. If the order of the signs within a code word is to be kept to, the user firstly has to make a selection of the first sign in his code word using the viewer 12 and the controller 14, and then selection of the second sign takes place and so on.

When the user has completed his selection, a comparison is undertaken by a comparison unit 8 with certain card data, stored in the memory ($S_2$) 4, to see that this data is in line with the selection data stored in the memory ($S_2$) 7. If the selection of the code word was right, the two memories 4 and 7 will have the same information in the memory locations coming into question. A signal to this effect is produced by the comparison unit 8, this being the starting signal for the necessary further steps for the operation.

It is to be noted generally at this point that dependent on needs and the price of the system, it is possible to make changes in the way of presenting the signs to make operation more, or less, straightforward and for changing the possible number of code words and, for this reason, the chances of strangers being able to get knowledge of separate code words, such changes being to a high degree controlled by the makeup of the code word and the needs with respect to the selection of the separate signs or symbols of the code word.

For example if the only question, taken to be important, is that the signs present in a special code word are to undergo selection from a certain number of signs stored without the order being important, the number of possible code words will be very limited, more specially if the number of signs for each code word is low.

However, in this case there will be the useful effect of the card reader's being simple in operation and furthermore the selection time for the code word will be short and the engineering of the system will be generally uncomplex.

If, on the other hand, the selection of the code word is to be such that a certain order of the signs within it is kept to and the code word itself is made up of a great number of signs or symbols, it is possible in many cases for there to be many more different sorts of the possible code words while, in some respects, the useful effects named earlier are limited.

Using FIGS. *2a* and *2b*, an account will now be given, by way of example, of a simple card reader, with which the process of the invention may be undertaken.

As will be seen from FIGS. *2a* and *2b*, a window 10 is present in the front plate 9 of the card reader 2 and behind this plate there is a roller 11 moved by a stepping motor, not detailed in the figure. On its outer face the roller 11 has a number of sections 12 each with two signs or symbols which are moved past the window 10, one after the other, in the direction of arrow 16, when the roller 11 is started turning by a card being put in the pocket 13. When the card-user sees that a section with a sign forming part of his code word is in the window, he will then make use of a push-button 14 which is placed in a space 15 within the card reader 2. The space 15 and the push-button 14 are, in this respect, so placed that it is not possible for a stranger to see if there has been any reaction of the card-user with respect to a certain sign or not.

On pushing down the button 14, as noted earlier, an electrical unit, placed in the card reader 2 as well, is acted upon. By way of this unit, the comparison to see if the signs are the same or not is undertaken. The workings of this unit will be detailed in connection with FIG. 3.

As will be seen from FIG. 3, the push-button 14 is joined by way of a turning switch 17 with the input of a first selection memory 7 ($S_1$). In this respect the turning or rotary switch 17 is joined with the roller 11, which has the sections 12 on it with the signs and, dependent on the number n of the sections on the roller, it is able to go into n switching positions. The turning switch 17, the push-button 14 and the memory 7 may be electromagnetic in design or fully electronic.

Function of the unit:

The card, in which the code word is recorded, is put through the pocket 13 (FIG. *2a*) into the automatic card reader. Then, in a unit 3, the information recorded on the card undergoes reading and is sent to a card memory 4 ($S_2$) with n memory locations. At the same time the roller 11 is caused to undertake a stepped motion out of its starting position. When this is done, the user is presented through the window 10 with n sections 12, one after the other, of which each has two signs. Each time a section comes into view, on which one of the two signs is the same as the sign in the user's code word, he will make use of the push-button 14, connected with a power supply 18, so that the memory location in memory 7 ($S_1$) representative of the sign or section, is acted upon.

Once input of the right code word has been undertaken by the user, the logical information in the memory 7 will be the same as that in the memory 4 and the comparison unit 8 gives the starting signal for further operation of the system.

Taking it to be the case that the code word is made up of m symbols, the order of the symbols is unimportant and selection of anyone of the sections 12 is not to take place more than once, the user, while the roller is being turned once, will make a selection of the m sections from the n (for example) sections on the roller, the m sections having the signs in question. In this case there will, all in all, be $$\binom{n}{m}$$

possible code words.

If it is, for example, taken to be the case than n=10, that is to say that there are 10 sections on the roller and that m=2, so that the code word has two signs, for example a letter and a picture sign, the outcome will be $$\binom{10}{2} = 45$$

possible code words. The number of the possible code words is low in relation, because the order of the symbols in the code word is unimportant and because, for each section, it is only possible for one sign to undergo selection. One useful effect of this selection process is that the user is, in all cases, offered two signs at the same time although he only has to make a selection of one of them. For this reason, the user is able to make a better note of the sign, which for him has a greater mnemonic effect.

The number of different sorts of code words may be increased if the signs, placed side-by-side in each case, on a section may be given the same effect for forming a code word. This may be effected, for example, by using two separately placed rollers of which, for example, one has letters and the other has picture signs and each roller has its own processing unit. It will be seen from this that each letter sign may be put together with anyone of the picture signs. In this special case there are $n^m = 10^2 = 100$ possible code words. A shortcoming in this process is, however, the more complex form of the processing system.

A further way of increasing the number of code words is that of taking into account the possible groupings (permutations) of the signs within a code word, that is to say taking into account the order of the signs or symbols. In this respect it is taken to be the case that each sign may only be used once within a certain code word. By definition, the number of permutations of m different signs is m.

Using a simple example with numbers, it is now to be made clear that the presenting at the same time of a number of signs taking into account the fact that the user on acting on the push-button 14 keeps to the right order of the sign in a code word, is beneficial not only with respect to the time of operation needed, but furthermore with respect to having a greater number of different sorts of code words.

If, taking the first example given as a starting point, the drum has 3 n=10 sections 4 each with m (=2) signs and each sign is presented for one second, the operation, in which the drum is turned round twice, will take 20 seconds. If the signs were to be presented serially, the time of presenting would be 40 seconds at the most.

The number of possible code words will be increased under the conditions in question, that is to say keeping to the order of the signs, from $\binom{10}{2}=45$ to $\binom{10}{2}\cdot 2!=90$. (2!=factorial 2)

In order to take into account the order of working of the push-button in the case of recording in the memory 7 as well, some further, small additions are necessary in the system of FIG. 3.

Figure 4:
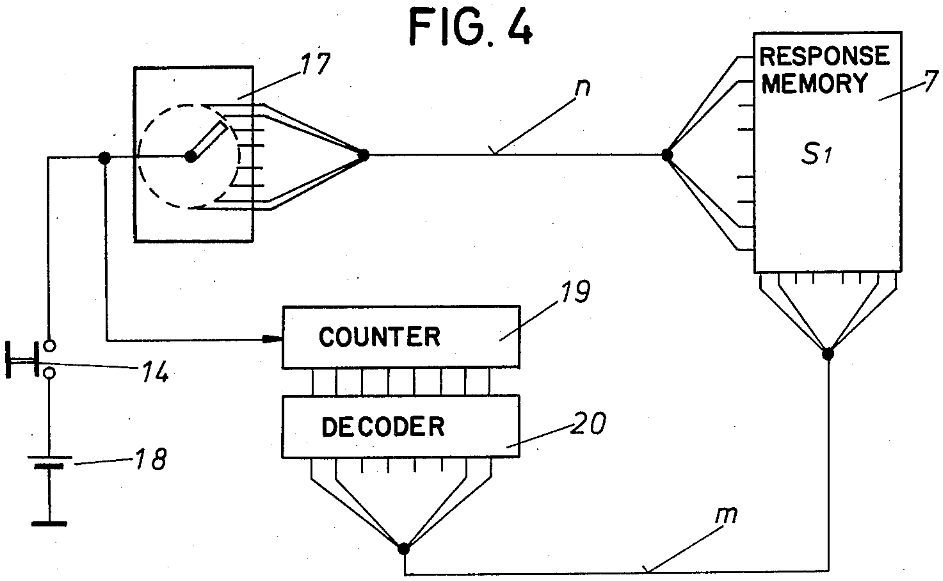
FIG. 4 is a view of a further development of the electrical system of FIG. 3.

As will be seen from FIG. 4, the output of the push-button 14 is in addition joined with a counter 19 which, for its part, is joined with a decoder 20.

The outputs of the push-button switch 14 are joined with the n-lines of a store matrix of the memory 7 ($S_1$), while the m-outputs of the decoder are joined with the m-columns of the matrix. By selection of one of the m-columns and one of the n-lines, each memory location of the matrix may undergo selection.

Using the further unit, it is possible to make certain that on the first pressing down of the push-button 14 (first sign of the code word) the first of the m-columns of the store matrix of the memory 7 is acted upon and on the second pushing down (second sign of the code word) the second column of the matrix is acted upon and so on, so that the order of the signs in the code word is fixed.

For general use it is useful for a code word to be made up of three signs, that is to say a letter, a number and a picture sign, because such code words have a high-level mnemonic effect. The signs may, to good effect, be presented in part sequentially and in part in parallel, so that in the left hand half of the picture window 10 (see FIG. 2) firstly 25 letters are presented and then 10 numbers, while in the right hand half of the picture window 35 readily grasped signs are presented. In this system, with only three sorts of signs presented in 2 goes, there are $25\times10\times35=8750$ different code words, a number which is certainly be taken to be great enough for protection of a card-user after loss or theft of his card. This is more specially true if steps are taken to see that even after the input of three wrong code words, operation of the apparatus is stopped and the card is kept in it.

An account will now be given of two further forms of the process of the invention, which make possible a shorter time for presenting and selection of a code word, without the number of possible code words being decreased.

As will be seen from FIG. 5, one section from the overall number of signs or symbols is presented on a viewer 21 (for example a monitor). The signs are moved slowly over the viewer screen. The sign coming into question for selection from the overall number of signs is marked by being presented in an unmoving electronic window 22. The useful effect of this form of presenting the signs is that the monitor 21 may, at the same time, be used for presenting the user with directions for use and that the user is able to see the sign forming part of his code word before it comes into the electronic window 22, with the outcome that the user is ready for the sign when it comes into the window. For this reason the time for presenting each sign or symbol may be made shorter. A mechanical system of much the same design would be possible making use of an endless band or tape, on which all signs are recorded.

Lastly an account is now to be given of a form of the invention to be seen in FIG. 6 which, as well, makes possible a very great number of code words while nevertheless having a short selection time.

As will be seen from FIG. 6 the user is presented with all stored signs within his field of view at once on a viewing table or screen 24. The signs are, for example, letters, numbers and picture signs. Unlike the method noted earlier, it is possible for the user to have control of the speed at which the single sign lines are to be run through a moving electronic selection window 23, by his working a button (not viewed in the figure) which has two functions, because it is able to be turned and, furthermore, able to be pushed. When the electronic window 23 has come to the sign or symbol in question, the sign undergoes selection by working the push-button. After the selection of all parts of a code word, the electronic window goes back automatically into a neutral, starting position.

In the last-named method the way in which selection takes place makes it necessary for the viewing table or the viewing screen with the signs to be so placed within the automatic card reader that, in each case, it is only privately to be seen by the user himself. However, by using side covers or a unit (as for example a Fresnel lens) in front of the ground glass screen, this may be readily effected.

In the case of a code word made up of four different sorts of signs or symbols, the store of signs to be seen in FIG. 6 with, for example four lines and ten columns, makes it possible to have $10^4=10{,}000$ different code words. On taking into account all permutations within the single code word, there would be $10^4\times4!=240{,}000$ different code words. The number of possible different code words may be very markedly increased further if the rules are such that the same sign may be used more than once within the same code word. The selection time for the last-named form of the invention is generally the same as the time needed for the input of a code word of the same effect using a normal keyboard with numbers.

In earlier methods for operation of automatic card readers, the personal code word is made up of a 4-digit number whose input takes place with a normal decimal keyboard.

Making use of the base-teaching of the present invention this system may be put to use straightforwardly by using the signs in question (that is to say the numbers 0 to 9) on a roller, on an endless tape or by having electronic viewing of the numbers.

For input of the code word the user is presented with all signs, if necessary more than once, to give him a chance to make a selection of the numbers in his code word by using a single key. In this respect input may be made more readily possible by having a mark for the digit which is to be completed at the time in question.

Furthermore, a stop key is to be present, with which any input made in error may be put right again.

If the method is used in an automatic machine for handing out money (or cash point) the text or number viewer present as well may be used if necessary. In this case, in place of the otherwise normally used decimal keyboard, only one selection key and a stop key will be necessary. For stopping observation by strangers, it is possible to make use of a screen (if it is not present for other reasons).

For indoor use a hand unit, joined by wiring with the rest of the system, may be used which, in form, is like the microphone with a handle of a dictating machine and, as well, has a funnel-like structure round the viewing opening for stopping observation by others.

I claim:

1. In a method of veryifying use by an authorized person of a card having readable code information thereon, the steps of supplying for use by an authorized user of a card a personal code word in the form of a set of symbols which corresponds to said readable code information, presenting to a user of a card a plurality of symbols including symbols forming said code word and additional symbols which do not correspond to said code word, said symbols being so presented as to allow only an authorized person with knowledge of said code word to identify those forming said code word, measuring responses of a user to the presentation of said symbols, and comparing said user responses with code information from the presented card to indicate correct responses by the user to said symbols which form said code word.

2. In a method as defined in claim 1, the steps of reading and storing readable code information from a card presented by a user, and storing measured responses of a user to presentation of said symbols, said step of comparing user responses with code information being performed with respect to said stored responses and code information.

3. In a method as defined in claim 1, said symbols being presented serially to said user.

4. In a method as defined in claim 1, at least some of said symbols being presented in parallel fashion to said user.

5. In a method as defined in claim 1, each presented form of symbol being presented at least twice.

6. In a method as defined in claim 1, said symbols being presented simultaneously to said user.

7. In a method as defined in claim 1, said steps of presentation of said symbols and said measurement of responses being so performed that the nature of at least one is shielded from observation by unauthorized persons.

8. In a method as defined in claim 1, said symbols being selectable from types including numbers, letters and picture characters with each code word including more than one of said types of symbols.

9. In apparatus for verifying use by an authorized person of a card having readable code information thereon, symbol presentation means for presenting symbols to a user, said symbols including a set of symbols which form a personal code word supplied to an authorized user and which corresponds to said code information and additional symbols which do not form said personal code word, response means for operation by a user to develop response signals measuring his response to symbols presented by said presentation means, and comparator means for comparing said response signals with code information obtained from a card presented by the user.

10. In apparatus as defined in claim 9, code information storage means, reading means for reading code information from a card presented by a user and supplying said information to said code information storage means, response storage means, means for supplying said response signals to said response storage means, said stored code information signals and said stored response signals being compared by said comparator means for indicating use of a card by an authorized person.

11. In apparatus as defined in claim 9, said response means including correction means for correction of an incorrect response by the user prior to operation of said comparator means.

12. In apparatus as defined in claim 9, said symbol presentation means including window means defining a viewing window, display means for displaying said symbols at spaced locations, and means for effecting relative movement of said window-defining means and said display means for identifying particular symbols.

13. In apparatus as defined in claim 12, said window means including a wall having a transparent opening therein, and said display means comprising a medium carrying said symbols and movable behind said wall with each symbol being visible to a user only when positioned behind said transparent opening.

14. In apparatus as defined in claim 13, means operable by the user for controlling the speed of movement of said medium.

15. In apparatus as defined in claim 13, said medium being in the form of an endless tape, and said display means comprising means for supporting and driving said medium for display of all symbols thereon during one cycle of movement.

16. In apparatus as defined in claim 12, said response means including means operable by the user for controlling the relative positioning of said display means and said window means.

17. In apparatus as defined in claim 9, said presentation means and said response means being so constructed and arranged as to shield at least one from observation and prevent an unauthorized person from correlating the symbols presented by said presentation means with the responses of a user.

18. In apparatus as defined in claim 9, said response means comprising a control unit operable by the user from a first condition to a second condition to signify identification of one symbol of his code word and to develop a response signal.

19. In apparatus as defined in claim 18, hood means associated with said control unit for shielding the mode of operation of said control unit from view.

20. In apparatus as defined in claim 9, said symbol presentation means being arranged to simultaneously present a large number of said symbols for view by the user, and said response means including means for operation by the user to identify selected symbols of those presented for view.

21. In apparatus as defined in claim 9, said symbol presentation means being arranged to present said symbols serially, and said response means being operable by the user to designate selected symbols as they are presented.

* * * * *